United States Patent

[11] 3,549,897

[72] Inventor Lawrence S. Blake
West Peabody, Mass.

[21] Appl. No. 718,724
[22] Filed Apr. 4, 1968
[45] Patented Dec. 22, 1970
[73] Assignee Dynamics Research Corporation
Stoneham, Mass.
a corporation of Massachusetts

[54] ABSOLUTE ENCODER HAVING PLURALITY OF BINARILY RELATED RETICLE TRACKS
8 Claims, 17 Drawing Figs.

[52] U.S. Cl. .......... 250/231, 240/41.6, 356/141
[51] Int. Cl. .......... G01d 5/34, G01b 11/26
[50] Field of Search .......... 250/231

[56] References Cited

UNITED STATES PATENTS

| | | | |
|---|---|---|---|
| 2,953,777 | 9/1960 | Gridley | 250/231SE |
| 3,237,012 | 2/1966 | Treffeisen | 250/227X |
| 3,412,256 | 11/1968 | Cronin | 250/231SE |

*Primary Examiner*—Robert Segal
*Attorney*—Joseph Weingarten

ABSTRACT: An absolute electro-optical encoder for indicating the angular position of a shaft, and including a stationary disk and a rotary disk having a plurality of concentric reticle tracks binarily related to one another. A plurality of photocells are arranged to receive light passing through the disks, the photocells being arranged in selected combinations with respect to each reticle track, and a plurality of illumination assemblies are arranged to illuminate selected combinations of photocells. Certain of the illumination assemblies include adjustable reflectors to precisely adjust the phase of the light impinging upon certain of the reticle tracks.

INVENTOR.
LAWRENCE S. BLAKE
BY Joseph Weingarten
Stanley M. Schurgin
ATTORNEYS

INVENTOR.
LAWRENCE S. BLAKE
BY
Joseph Weingarten
Stanley M. Schwarz
ATTORNEYS

INVENTOR.
LAWRENCE S. BLAKE
BY Joseph Weingarten
Stanley M. Schurgin
ATTORNEYS

INVENTOR.
LAWRENCE S. BLAKE
BY Joseph Weingarten
Stanley M. Schurgin
ATTORNEYS

INVENTOR.
LAWRENCE S. BLAKE

BY

ATTORNEYS

INVENTOR.
LAWRENCE S. BLAKE
BY Joseph Weingarten
Stanley M. Schurgin
ATTORNEYS

PATENTED DEC 22 1970

3,549,897

INVENTOR.
LAWRENCE S. BLAKE
BY Joseph Weingarten
Stanley M. Schurgin
ATTORNEYS

INVENTOR
LAWRENCE S. BLAKE
BY Joseph Weingarten
Stanley M. Schwinger
ATTORNEYS

ABSOLUTE ENCODER HAVING PLURALITY OF BINARILY RELATED RETICLE TRACKS

FIELD OF THE INVENTION

This invention relates in general to shaft encoders and more particularly to an electro-optical encoder providing an output signal indicative of the precise rotational position of a shaft.

BACKGROUND OF THE INVENTION

Shaft encoders are devices which translate the rotational position of a shaft into an output signal indicative of the position of that shaft. These encoders may be considered in two broad categories, generally referred to an incremental encoders and absolute encoders. An incremental encoder provides a series of discrete output signals as a function of rotation, the number of signals being related to the amount of rotation of the shaft. Thus in order to determine the position of the shaft at any given time, the amount of rotation from a reference position is calculated by computing the total number of signals which have accumulated since the shaft was in that position. This type of encoder, then, requires continuity of operation and, additionally, must be designed to prevent cumulative errors. The absolute encoder, on the other hand, is a device which provides an output signal which, at any given time, itself directly indicates the angular position of the shaft. One form of an absolute encoder employs one or more discs each having a number of concentric tracks on one of its surfaces. Each track is made up of alternate sectors which can represent a ZERO state or a ONE state, and the period or number of sector pairs on each track differs by a factor of two from the number of periods on any other track. If there are ten tracks so related, then the total angular position of the shaft may be directly indicated to an accuracy of at least $\frac{360°}{2^{10}}$. The output signal from this absolute encoder would then be a ten-bit binary signal, each angular position producing a unique ten-bit number.

Either of the types of encoders described above may employ one of several transducing mechanisms such as magnetic, electrical, optical or combinations of these. Electro-optical encoders usually employ a light source which directs a beam of light onto discs which have alternately light-opaque and light-transmissive sectors. Such encoders employ photosensitive devices to provide electrical signals, the magnitude of the signals being directly related to the amount of light incident upon the sensors.

While the design of absolute encoders of the electro-optical type are relatively straightforward for situations where the required precision of measurement is not extremely high, the problems of design become quite subtle and complex when these devices must accurately measure angular differences of the order of 50 seconds of arc. The nature of the binary numbering system itself gives rise to one of the problems associated with high accuracy absolute encoders. When the straight binary code is used, it is possible that for one incremental unit of change, every bit in the multibit binary code may change state. Thus if the change of state in any reticle track is not in extremely precise alignment with the change of state in all the other tracks, at the point where such alignment is required, the resultant output signal can present an enormous error in terms of the indicated shaft position. Various solutions to this problem have been employed in the past. One solution is to arrange the tracks on the discs so that their relationship is not in a straight binary code but rather is in a variation of that code, such as a Gray or cyclic code. Still another approach involves the use of two spaced-apart sensing positions for each track, where the state of the sensing device in the most sensitive track determines which of the sensors in the next track shall be used to provide the output. The technique may be repeated for each track, or the decision may be made only at the most sensitive track. Systems using this "selection of sensors" technique are referred to as V-scan or U-scan systems.

Other errors in encoders of this type arise from the physical manufacturing and structural limitations of the devices. Such errors include miscentering of the disc on the shaft, bearing runout which results in a gradual miscentering with time, variations in the light transparency of the clear areas of the discs and variations in light intensity and photosensor response where a number of light sources and photosensors are employed. These physical problems become particularly acute in high accuracy encoders where the physical dimensions must be kept very small. For example, many of these encoders are employed in airborne navigational systems where the dimensional limitations are severe.

SUMMARY OF THE INVENTION

Broadly speaking, the present invention provides a high accuracy absolute encoder for indicating the angular position of a shaft. The encoder employs a pair of discs, one fixed to a reference point and the other being arranged to rotate with the shaft. The disc rotating with the shaft is provided with a number of concentric reticle tracks in binary relationship to one another. The fixed disc is provided with matching reticle segments designed to register with the higher accuracy tracks on the rotating disc. A number of photosensors are positioned to receive light transmitted through the reticle tracks on both discs from appropriately positioned light sources. The reticle segments on the fixed disc do not, however, extend entirely around the disc but rather are limited to those areas overlying photosensors. The rotation of the disc with the full reticle tracks past those portions of the stationary disc which contain matching reticles produces a modulation of the light incident on both discs at that point, and this modulation appears as an alternating current output signal from the photosensors underlying these reticle segments.

In the encoder, each track has two signal photosensors positioned with respect to each other such that their respective electrical output signals are 90° out-of-phase, producing, therefore, for each track, a pair of 90° out-of-phase electrical signals. These orthogonal signals provide outputs which can be in straight binary or cyclic code form. These signals may be combined by appropriate electronic circuitry to produce a multiple-bit signal which is unique for each angular position of the rotary disc and which, therefore, precisely indicates the angular position of the shaft associated with the rotary disc.

Each of the signal photosensors in the most sensitive tracks are connected to additional photosensors which are operative to correct for miscentering of the disc and for variations in light transparency around the disc. Any error due to miscentering is corrected by placing a second photosensor 180° physically spaced from each signal photosensor and arranging it so that its electrical output is electrically displaced 180° from the output of the signal photosensor. The outputs of these two sensors are then connected in phase opposition so that their output signal will pass through zero and will have an average value of zero. This is particularly desirable because it is the zero crossing, or change of state, which gives rise to signal pulses which the associated electronics employs for position indication. Both the signal photosensor and its 180° out-of-phase correcting sensor are compensated for variations in the transparency around the disc by placing third and fourth photosensors behind a clear area of the stationary disc, each one closely adjacent to the respective sensor it is compensating. These latter photosensors provide output signals which vary only with the variation in transparency of the rotary disc track. On these most sensitive tracks, therefore, each output signal is produced by a combination of four photosensors and each of these tracks has then a total of eight photosensors to produce two compensated 90° out-of-phase electrical output signals.

The intermediate sensitivity tracks require only four photosensors to produce the pair of output signals because the lesser numerical significance of their outputs makes compensation for variation in transparency around the periphery of these tracks unnecessary. The four photosensors on these tracks are arranged in two pairs, the photosensors in each pair being physically separated by 180° to produce electrical outputs 180° out-of-phase. The pairs are positioned so that the signals from each pair are 90° out-of-phase.

The least sensitive tracks need no correction for miscentering or for variations of transparency and, in fact, no reticle segments are placed on the fixed disc to correspond to these tracks. Each of these tracks employs four photosensors, two of which are positioned to give signals which are 90° electrically out-of-phase with the fixed disc. The remaining two sensors are positioned under a clear area in registration with a separate clear track on the rotating disc and are used to provide direct current bias for the two signal photosensors so that the signal outputs have the requisite zero crossings.

The signal from each photosensor in the encoder is produced by a beam of light transmitted through the pair of discs and incident upon it. The light beam should be collimated for the intermediate and high sensitivity tracks to minimize phase errors which could result from angular deviation of light within the beam. For a 16-bit encoder, there are more than 70 photosensors, each of which must be provided with a source of light, most of them requiring the incident light to be collimated. Since the most sensitive tracks each require eight photosensors, there must be eight light sources for them, precisely arranged to produce the out-of-phase signals previously referred to. If a separate lamp were used for each light source, the probability of failure of at least one lamp would be relatively high, and, of course, the failure of one lamp would render the output signal inaccurate. Also, the problem of adjusting the positions of these individual lamps to produce precise phase relationships is very difficult for the most sensitive tracks. Further, the relative light intensities of the several lamps are difficult to maintain at a stable level. According to the present invention, these problems are substantially minimized by an arrangement of light sources to produce accurately collimated light using only four lamps for a 16-bit encoder. It is a feature of this invention that these light sources are constructed to provide for the very sensitive phase displacement needed in the most sensitive tracks.

DESCRIPTION OF THE DRAWINGS

The invention will be more fully understood from the following detailed description, taken in conjunction with the accompanying drawings, in which.

DESCRIPTION OF THE PREFERRED EMBODIMENT

Figure 2:
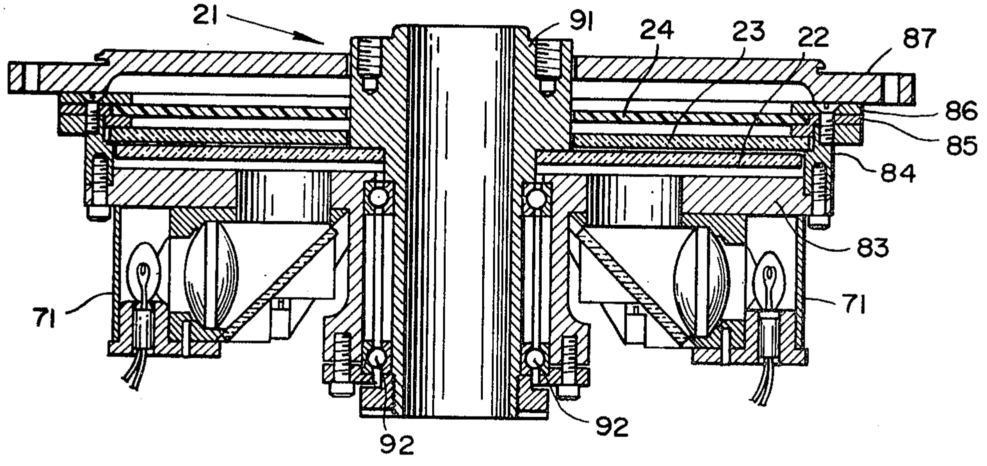
FIG. 2 is a cross-sectional view of the absolute encoder taken through cutting plane 2–2 of FIG. 1.

With reference now to the drawing and specifically referring to FIG. 2, there is shown in section an absolute encoder 21 having two light modulating discs 22, 23 with light sensors mounted on a support 24 located above the two discs and a system of light sources 71 located below them. The disc 22 is designed to rotate relative to disc 23 which remains fixed with reference to the light sources 71 and the sensor support 24. The rotation of disc 22 modulates light which comes from the light sources 71 and passes through both discs to the sensors on support 24. In response to this light, the sensors produce a correspondingly modulated electrical output. The overall encoder may be considered as three subsystems; the light sources, the discs and the sensors. For purposes of clarity each of these subsystems will be described in detail prior to describing the operation of the overall system.

THE DISCS

Figure 3:
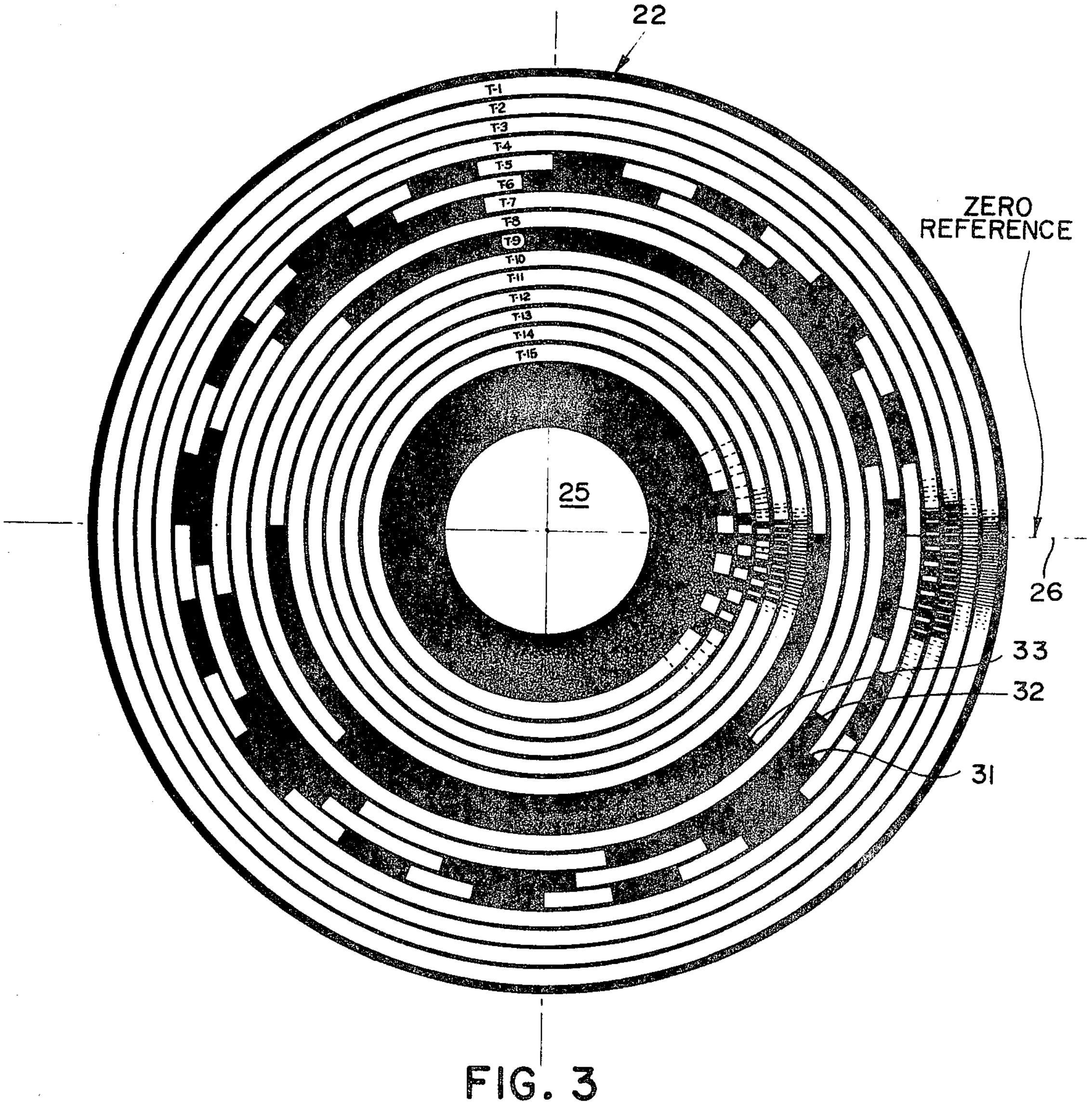
FIG. 3 shows the track pattern of a rotary disc used with the absolute encoder of FIG. 1.
Figure 4:
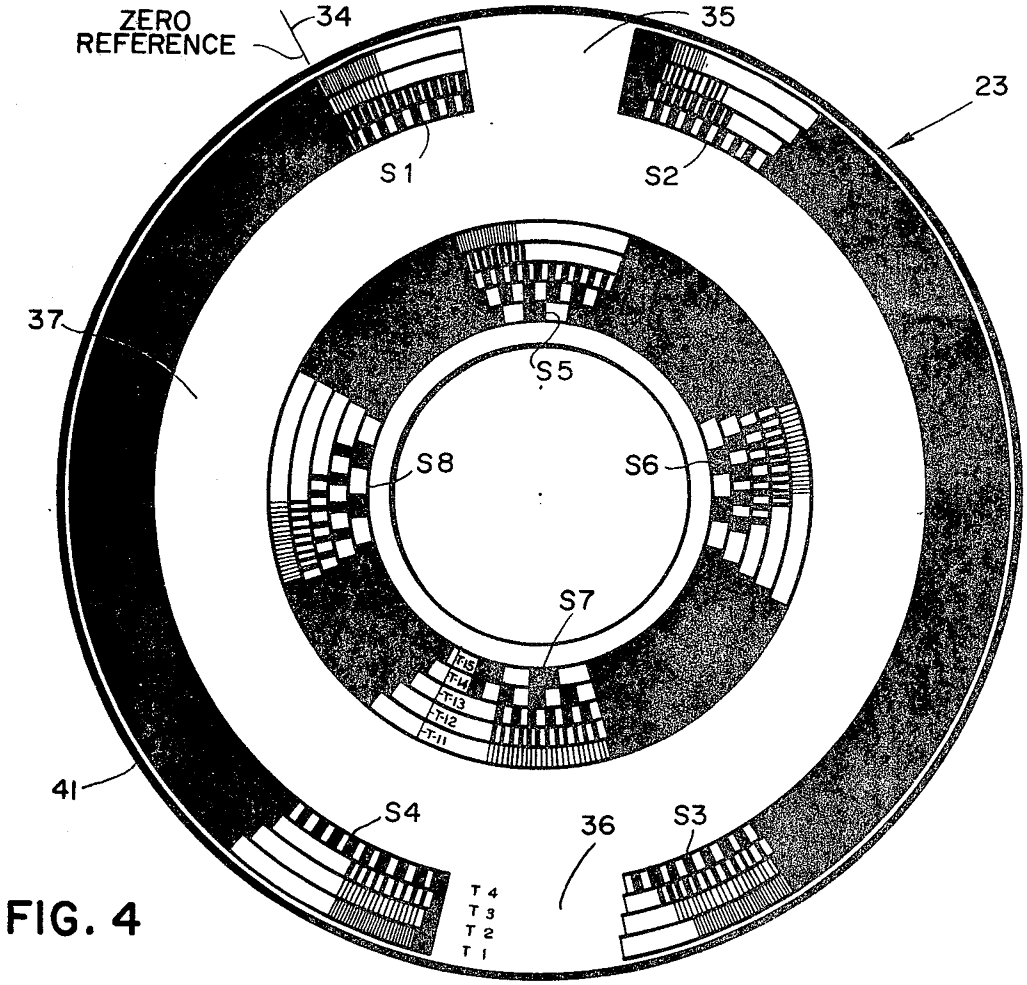
FIG. 4 shows the track pattern of a stationary code disc designed to register with the rotor of FIG. 3.

The reticle tracks of rotary disc 22 and stationary disc 23 are illustrated in FIGS. 3 and 4, respectively. The rotary disc 22 is shown in FIG. 3 as having 15 concentric annular tracks designated T1 through T15, each track having alternating opaque and transparent sectors. The number of the periods, where a period is defined as a pair of one opaque and one transparent sector, is different for each reticle track on this disc. The track periods are all in binary relationship to one another, the most sensitive track, T1, having $2^{13}$ periods, while the coarsest track, T10, has $2^0$ periods. The tracks may be considered in three groups according to their sensitivity, the highest sensitivity tracks, T1, T2, T3 and T4, being outermost on the disc 22. The intermediate sensitivity tracks T11 through T15 are innermost on the disc 22 and the least sensitive tracks T5, T6, T7, T9 and T10 are located between the most sensitive and the intermediate sensitivity tracks. Track T8 is a clear area extending annularly around the disc and serves as a window for transmitting light to biasing cells, as will be explained in more detail below.

In FIG. 3, for purposes of illustration, only one small section of each of the more sensitive tracks is shown. However, the reticle tracks on this rotary disc 22 do in fact continue entirely around the circumference of the disc. Also, the sector sizes for the finer tracks in FIG. 3 have been enlarged in order to indicate the pattern. In actual fact these sector patterns are much finer than shown. Each of the reticle tracks on disc 22 begin with an opaque sector at an arbitrary reference line 26, with the exception of tracks T6, T7 and T9. Tracks T6, T7 and T9 have their patterns displaced from the patterns of the other tracks in order to provide for a more convenient arrangement of light sources and sensors. The number of periods for each track on the rotary disc 22 is listed in Table I for reference purposes.

TABLE I

| Track Number: | Number of periods per 360° |
|---|---|
| T1 | 8, 192 |
| T2 | 4, 096 |
| T3 | 2, 048 |
| T4 | 1, 024 |
| T5 | 16 |
| T6 | 8 |
| T7 | 4 |
| T8 | Clear |
| T9 | 2 |
| T10 | 1 |
| T11 | 512 |
| T12 | 256 |
| T13 | 128 |
| T14 | 64 |
| T15 | 32 |

The stationary disc 23 is shown in FIG. 4. For the highest sensitivity tracks T1 through T4, there are four groups of short segments of these tracks located in annular positions to register with the tracks of corresponding number on disc 22. Each segment of track is identical to the pattern of the corresponding track on rotary disc 22. Since the stationary disc remains fixed with respect to the light sources and sensors, only those portions of the disc overlying the photosensors need have the track pattern. The four groups of segments are designated S1, S2, S3 and S4. The four track segments in group S1 have their first opaque sector beginning at an arbitrary reference line 34. The track segments in group S2 do not, however, all commence at a single radial position, but, rather, the tracks are offset from one another, the reason for the track to track offset being as follows. In order to produce the 90° phase displaced signal of the respective tracks for photosensors underlying group S2, the light pattern from this position on the stationary disc must be 90° out-of-phase with the light pattern produced by the relative reticle track in group S1. To accomplish this, the first opaque sector on a track in S2 must be displaced from the reference 34 a distance which differs from an integral number of periods just enough to provide for a 90° phase difference in light transmitted through the two discs. Where the patterns on both discs are identical, a shift of one-half the width of one opaque or transparent sector will provide the requisite output phase shift. Since the period for each of the tracks T1 through T4 differs, the amount of displacement required to achieve a 90° phase shift also differs and hence the initial track sectors in the second group S2 are staggered. In the same fashion the initial sectors in group S3 and S4 are staggered to produce additional phase displacements of 180° and 270°, respectively, from the first group S1.

On the stationary disc 23 there are also groups of track segments for each of the intermediate sensitivity tracks T11 through T15, these groups being designated S5, S6, S7 and S8. As in the case of the high sensitivity tracks, the opaque sectors on each track in group S5 begin at a single radial line while the sectors in the remaining groups are offset from track to track to provide the proper phase relationships.

That portion of stationary disc 23 which is aligned with tracks T5 through T10 on the rotary disc 22 is left clear. There are no track patterns in this area because they are not required for the operation of the coarsest tracks. In the case of the coarse tracks, the dimensions of the photosensors with respect to the dimensions of the track sectors are such that the phase displacements may be obtained by positioning of the photosensors alone. Additionally, areas 35 and 36 which lie between groups S1 and S2 and S3 and S4, respectively, are transparent and are in registration with the transparency compensation sensors previously mentioned with respect to the high sensitivity tracks. The remainder of the nonreticular portions of stationary disc 23 is made opaque.

The discs 22 and 23 may be formed of a number of suitable materials, glass being a preferred choice. The track patterns may be applied to these discs by photoengraving, etching, vacuum deposition, or by any other suitable process which provides a precision pattern of opaque and transparent sectors.

THE SENSOR SYSTEM

Figure 5:
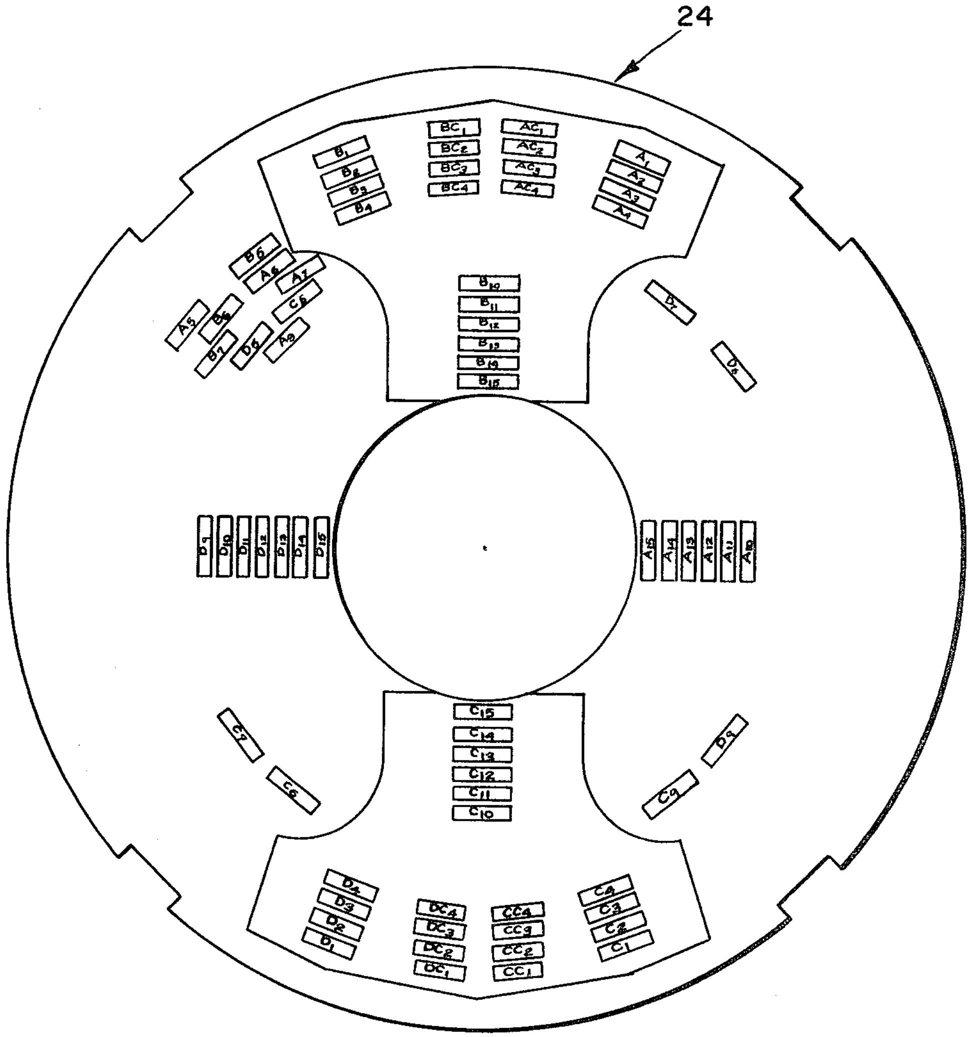
FIG. 5 is a plan view of a cell board indicating the positions of photocells employed in the absolute encoder of FIG. 1.
Figures 7, 8, 9:
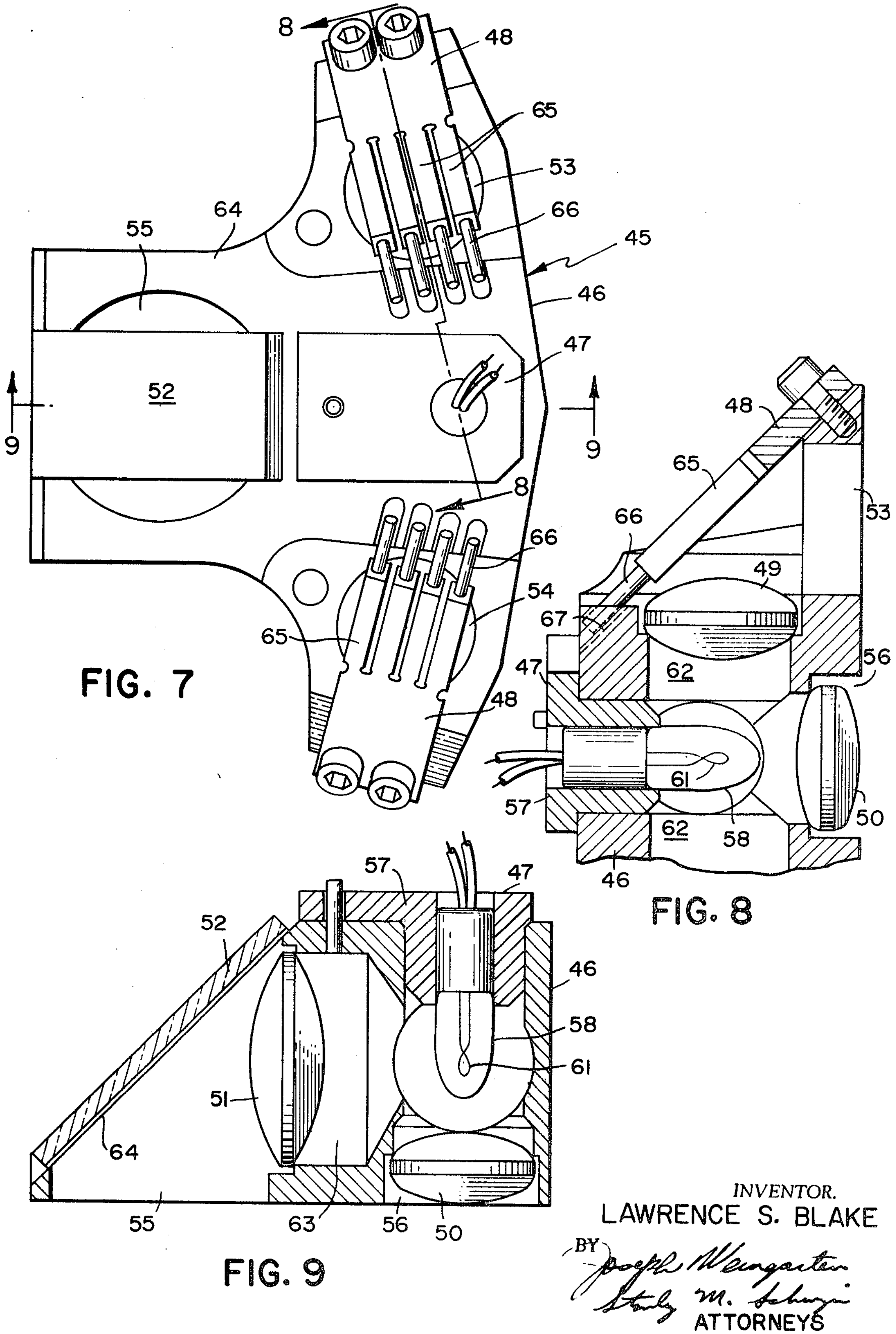
FIG. 7 is a plan view of one type of illumination module constructed in accordance with the principles of this invention.
FIG. 8 is a sectional view of the module of FIG. 7 taken through plane 8–8.
FIG. 9 is a sectional view of the module of FIG. 7 taken through plane 9–9.
Figure 10:
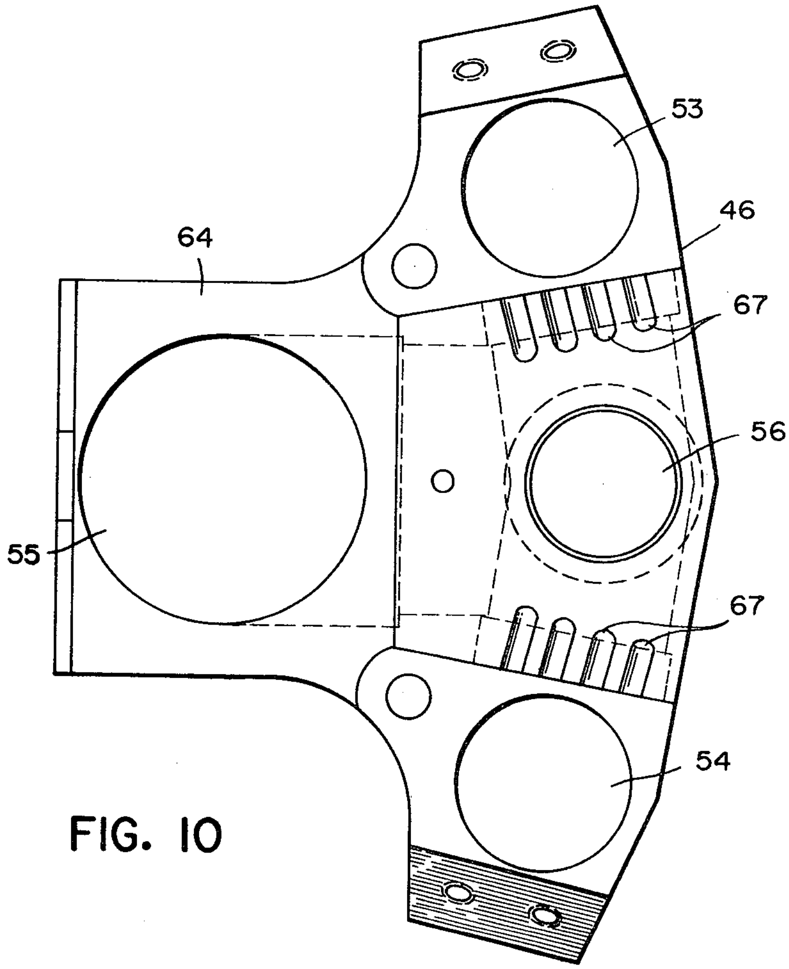
FIG. 10 is a plan view of the housing of the illumination module of FIG. 7.
Figure 14:
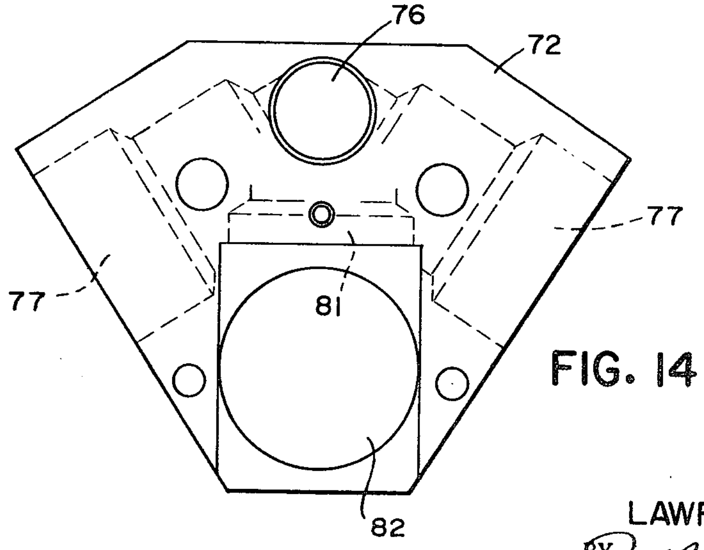
FIG. 14 is a plan view of the housing of the illumination module of FIG. 11.
Figure 11:
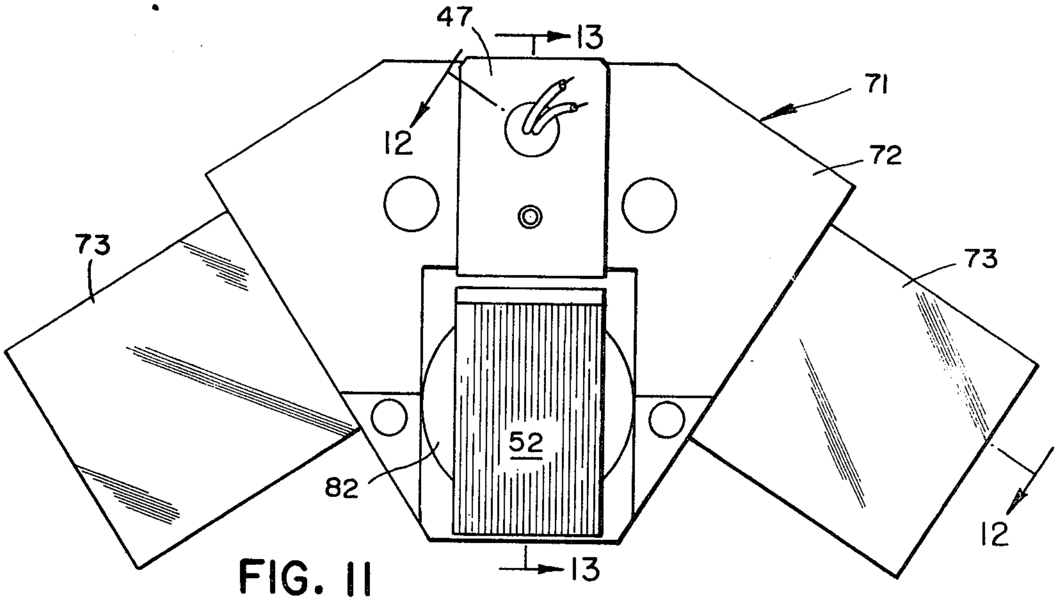
FIG. 11 is a plan view of another type of illumination module constructed in accordance with the principles of this invention.
Figure 12:
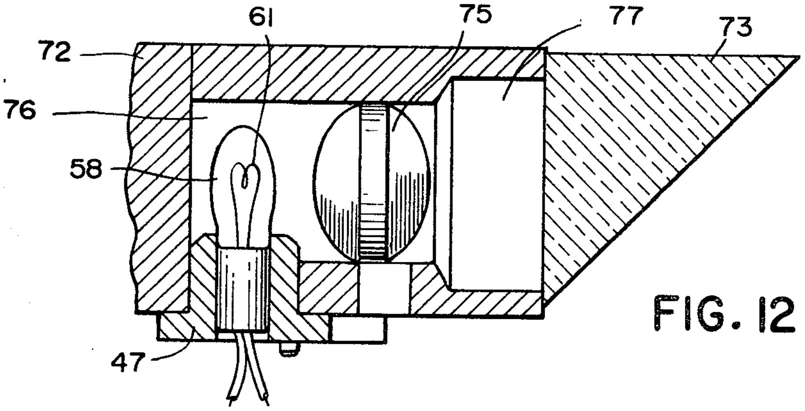
FIG. 12 is a sectional view of the module of FIG. 11 taken through plane 12–12.
Figure 13:
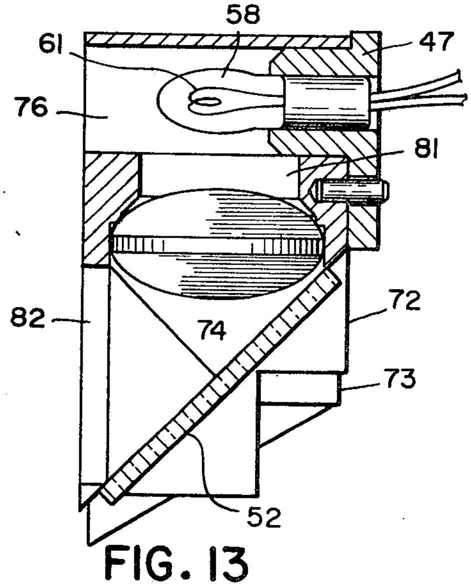
FIG. 13 is a sectional view of the module of FIG. 11 taken through plane 13–13.

The arrangement of photosensors on cell board 24 is illustrated in FIG. 5. The letter designations of the sensors indicate the function of the sensor, while the numeral suffixes indicate the track on the discs to which the particular sensors relate. Thus, the letter designation A indicates those sensors which produce the 0° phase signal and the sensors designated B are those which produce the 90° out-of-phase signal. The sensors designated C are connected in back-to-back relationship with the signal sensors B to provide a symmetrical waveform so that each output signal from the encoder will have an average value of zero and the waveform will pass through zero. The sensors designated D perform the same function for the signal sensors designated A. In the high sensitivity tracks T1 through T4 there are included for each of the sensors designated A, B, C, and D a compensating sensor to correct for variations in transparency around the disc. The compensating sensors are indicated by a suffix letter C. For example, the 90° phase displaced sensor in track T1 is designated as B1 and its compensating sensor is designated BC1.

The position of each sensor on the board is determined by its function and by the configuration of the illumination system. The four high sensitivity tracks each have eight sensors and, for these tracks, the opposing sensors C and D must be located 180° physically away as well as 180° electrically away from the signal sensors designated B and A. This physical positioning is required in order to compensate for miscentering and radial runout in these high sensitivity tracks. The electrical relationship of 180° is required for biasing purposes to produce a waveform symmetrical about zero, as explained above. The compensating sensor for each of sensors A, B, C and D of tracks T1 through T4 should ideally be positioned as closely as possible to the cell which it is compensating since its function is to correct for variations in transparency around the disc which variations normally have a substantial angular width.

The intermediate sensitivity sensors for tracks T11 through T15 are also arranged so that the photosensors C and D opposing the signal photosensors B and A respectively are positioned 180° physically and electrically away from their signal sensors. This group of sensors does not, however, require transparency compensating sensors because of the lesser significance of their outputs.

The coarsest sensitivity tracks T5 through T10 require that the signal sensors A and B be positioned with respect to one another such that there is a 90° phase difference in their electrical output signals. Since the length of the sensor in the direction extending along the track of the rotary disc is equal to or less than the length of one opaque sector on the track extending in the same direction, then the position of the sensor itself controls the phase relationship between sensors. In contract with the sensor arrangements for the intermediate and most sensitive tracks, the C and D sensors for these coarsest tracks are not sensors positioned to generate a signal which is equal to and 180° electrically displaced from the signal sensors, nor are they 180° physically away for miscentering correction. Rather the C and D sensors for these coarse tracks are used to generate a direct current bias so that the signal output from the sensors A and B has an average value of zero and the waveform crosses through zero. These C and D sensors are then positioned on the board 24 to be in registration with track T8 on the rotary disc 22. This track is transparent, thus these sensors receive unmodulated light. Since the average light received by the signal sensors designated A and B in these coarsest tracks is approximately one-half the full intensity of the incident light due to the opaque sectors on the rotary disc then the bias cells C and D for these tracks must be modified to produce an electrical output signal corresponding to about one-half the incident light. One convenient way of arranging this is to spray or otherwise coat these cells with a light absorbing material until the appropriate output is achieved. The position of the cells for the coarse tracks is controlled primarily by the convenience of the light illumination system, and it is for this reason that the cells for track T10 are radially aligned with the cells for tracks T11 through T15. The positioning of cell B9 is similarly dictated by convenience of the illumination source.

The cells may be formed of any suitable photosensitive element, silicon solarcells being a typical example. The support member 24 may be any suitable insulating support such as phenolic.

Figure 6A:
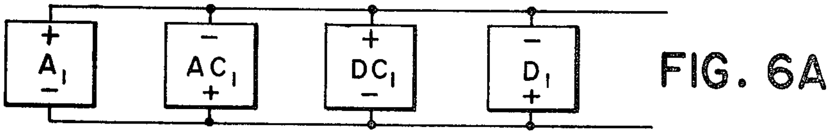
FIGS. 6A through 6C are examples of the electrical connections of the photocells shown in FIG. 5.
Figure 6B:
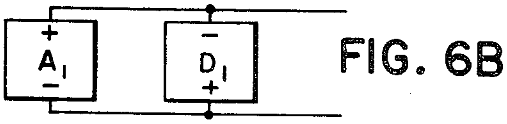
Figure 6C:
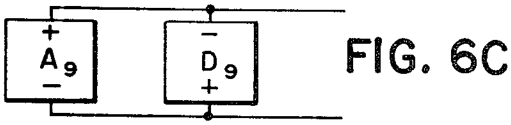

The interconnection of sensors to produce waveforms which are symmetrical about zero is illustrated in FIGS. 6A through 6C. In FIG. 6A the interconnection of cells is shown for the most sensitive track T1. FIG. 6B shows the interconnection between the A and D cells for the intermediate sensitivity track T11, while FIG. 6C illustrates the interconnection between the A and D cells for track T9. While only the A signal cells are illustrated, the arrangement for the B signal cells is similar.

THE LIGHT SOURCE SYSTEM

The function of the light source system is to provide the basic illumination, which is incident upon the modulating discs and is received in its modulated form by the sensors. The light incident upon the most sensitive tracks and the intermediate sensitivity tracks must be collimated in order to maintain the accuracy of the encoder. The light incident upon the coarsest tracks need not be collimated. The light source arrangement of this encoder includes one pair of each of two basic light modules, each of which employs a single lamp. Thus only four lamps are required to produce all of the illumination required for all of the sensors in the encoder. One type of module 45 produces the illumination for the highest sensitivity tracks T1 through T4 and also for the B and C sensors for the intermediate sensitivity tracks T11 through T15. The other type of illumination module 71 serves as a light source for the remaining two sensor positions (A and D) for the intermediate sensitivity tracks and also provides the light for the coarsest tracks. As will become apparent from the discussion to follow, the first type of module also provides, in one instance, light for two sensors which operate in response to the coarse tracks.

The details of the first type of illumination module 45 are illustrated in FIGS. 7, 8, 9 and 10. This module includes a housing 46 which has mounted within it a lamp assembly 47. The lamp assembly 47 comprises a lamp holder 57 and a lamp 58 which includes a filament 61. The lamp assembly 47 is mounted within the housing so that the light from the lamp is transmitted through a pair of lateral openings 62, an opening 63 extending radially toward the axis of the discs and an opening 56 through which the rays are directly incident upon, and normal to, the plane of the disc. A collimating lens 50 is positioned within opening 56 so that the light transmitted through this opening is collimated. A second collimating lens 51 is positioned in opening 63 to collimate light passing from the lamp 58 through this opening. The collimated light emerging from lens 51 is incident upon front surface mirror 52 which has been fixed to the sloping surface 64 of housing 46 in a position to reflect the collimated light downward into normal incidence with the reticle patterns on the disc 22. A pair of collimating lenses 49 (only one of which is shown) are mounted in openings 62 to collimate light passing from lamp 58 through them onto strip reflector units 48. These strip reflector units 48 each have four strip reflectors 65 formed of a reflecting material which can be deflected to a specific angular position. A suitable material for these units is aluminum sheet. Each of the strip reflectors 65 has a dowel 66 extending from its end. Each of individual strips 65 is adjusted by deflecting it slightly in a direction perpendicular to the plane of the overall reflector unit 48 in order to change the angle of reflection of the light incident on it from the collimating lens 49. As will be discussed in more detail subsequently, this adjustment provides for extremely sensitive phase adjustment of the light pattern incident upon the signal sensors in the most sensitive tracks. When the proper adjustments have been made to each strip reflector the dowels 66 are secured, such as by cementing, into milled grooves 67 in the housing 46.

Each of the collimating lenses 49, 50 and 51 is adjusted so that the filament 61 in lamp 58 is at the focal point of the lens and, once adjusted, the lens is cemented or otherwise secured in place. Lens 50 transmits light from the lamp 58 onto the most sensitive reticle track in a position so that the resultant transmitted light is received only by the compensating sensors located under the clear areas 35 and 36 on the stationary disc 23. Thus the light transmitted through this lens 50 need not be collimated and it is rather the purpose of this lens to condense the light into a generally confined beam.

The second type of illumination module 71 is illustrated in detail in FIGS. 11 through 14. This module includes a housing 72, in a central cavity 76 of which is mounted a lamp assembly 47 which is identical with the lamp assembly used in module 45. Extending from two sides of the housing 72 are right angle, totally reflecting prisms 73. The housing 72 is formed with an opening 81 permitting light to be transmitted from the lamp 58 through the opening 81 in the direction of the axis of the discs. This transmitted light is incident upon the face of a front surface reflecting mirror 52 which is positioned to reflect the light at normal incidence onto the reticle tracks of the disc. A collimating lens 74 is mounted within opening 81 to collimate this transmitted light. A pair of openings 77 in housing 72 provide a passage for light from lamp 58 to the prisms 73. A condensing lens 75 in each of the openings 77 forms the light into a beam which is then incident upon the angled face of the prism and reflected into generally normal incidence with the plane of the reticle tracks on the discs 22 and 23. Since the light reflected from the prisms 73 is incident only upon the coarsest tracks, it need not be collimated. Thus the lens 75 need not be a precisely positioned collimating lens.

ASSEMBLY AND OPERATION OF THE ABSOLUTE ENCODER

Figure 1:
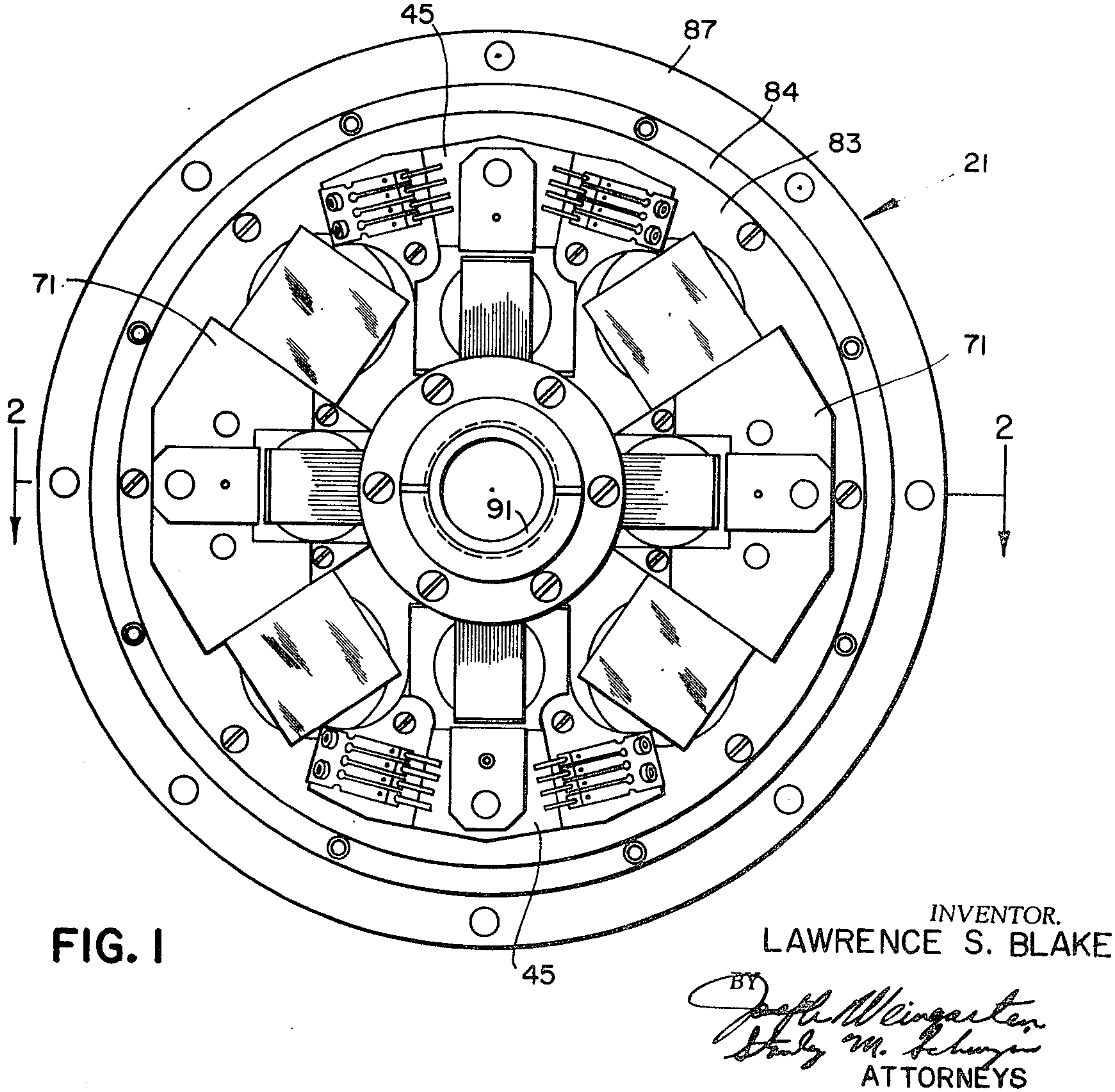
FIG. 1 is a plan view of an absolute encoder constructed in accordance with the principles of this invention.
Figure 15:
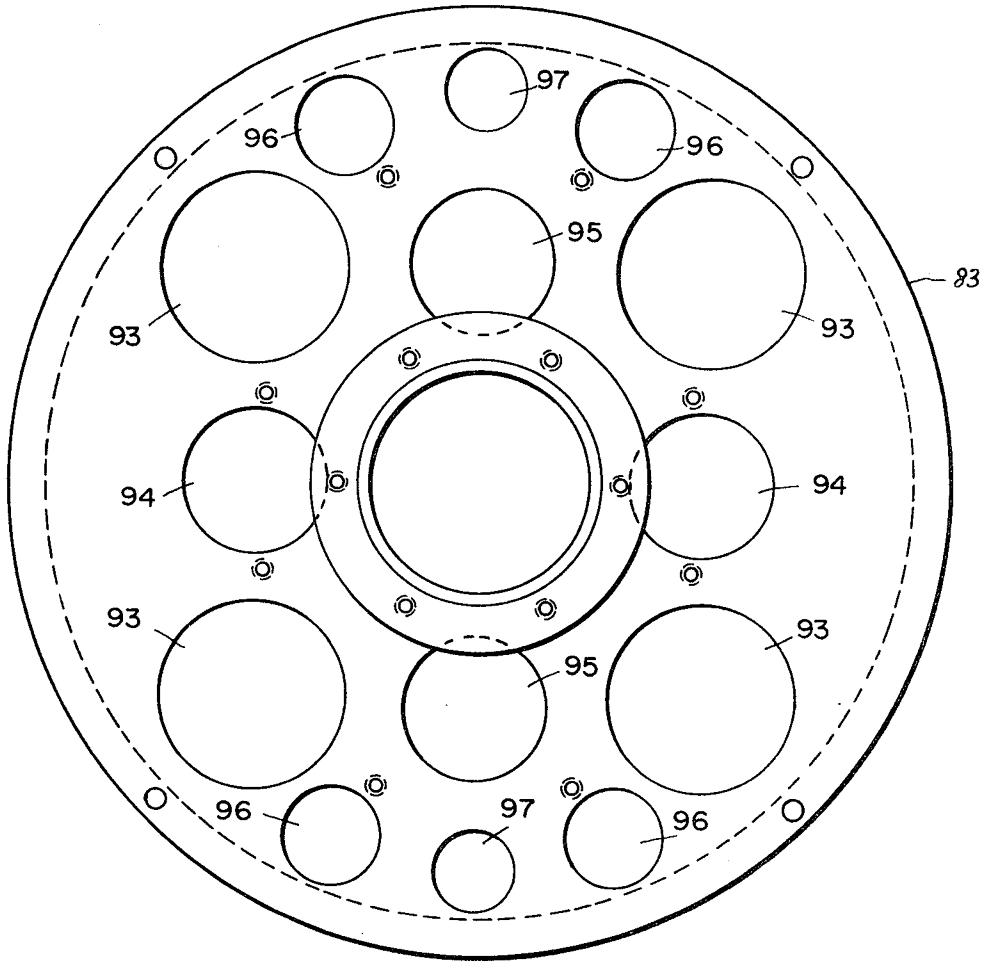
FIG. 15 is a plan view of the housing of the absolute encoder of FIG. 1.

The basic element of the absolute encoder assembly itself is encoder housing 83, to which nearly all other parts are directly connected or otherwise closely interrelated. FIG. 15 is a plan view of encoder housing 83. With further reference to FIG. 2, there are attached to encoder housing 83 stationary disc mounting flange 84, cell board bracket 85, cell board clamp 86, and top mounting flange 84, cell board bracket 85, cell board clamp 86, and top mounting flange 87. Elements 84, 85 and 86 provide means of securing the stationary disc 23 and cell board 24 to the main housing of the absolute encoder. Shaft 91 passes through the center of encoder housing 83 and is rotatably secured thereto by means of bearing assembly 92. Rotary disc 22 is secured to and rotates with shaft 91. Attached to the bottom of encoder housing 83 are two each of illumination modules 71 and 45 in the positions indicated in FIG. 1. As shown in FIGS. 1 and 15 the prisms 73 direct light through the large openings 93, and the mirrors 52 of the illumination modules 71 direct light through intermediate size openings 94. The mirrors 52 of the illumination modules 45 direct light through intermediate size openings 95, while strip reflectors 65 direct light through small openings 96. The light transmitted from lamps 58 through openings 97 in the housing 56 in illumination modules 45 is directed through openings 97 in the housing 83.

The stationary disc 23 and cell board 24 are secured to the encoder housing in the angular relationship shown in FIGS. 4 and 5. Thus the reticle segment groups S1 through S4 and S5 and S7 of stationary disc 23 are aligned above and in registration with beams of light provided by illumination module 45, while segments S6 and S8 are aligned with beams of light provided by illumination modules 71. Similarly the photosensors underlying tracks T1 through T4 and one-half the sensors underlying tracks T10 through T15 are also aligned and register with light provided by illumination modules 45, while the remaining photosensors are illuminated by light provided by illumination modules 71. The alignment between stationary disc 23 and cell board 24 places the signal photosensors and correcting photosensors of tracks T1 through T4 in registration with segments S1 through S4 while the compensating cells of these same tracks are in registration with clear areas 35 and 36 of stationary disc 23. The signal cells for tracks T11 through T15 are aligned to register with segments S5 through S8, while all the cells, both signal and DC bias, of tracks T5 through T10, are located in registration with the annular clear area 37 of stationary disc 23.

As rotary disc 22 revolves with respect to stationary disc 23, the light passing from the illumination modules to the photosensors is modulated so that when the transparent sectors of the track on the rotary disc are aligned with the transparent sectors of the track segments on the stationary disc, the underlying photosensors receive maximum light and provide a maximum amplitude electrical signal. When rotary disc 22 rotates through the angle of half of one period for a particular track, the opaque sectors on the rotary disc 22 then overlie the clear sectors of the stationary disc 23, thereby providing the underlying photosensors with a minimum amount of light and producing the minimum electrical signal. This 180° electrical phase change results from rotation of the rotary disc 22 through the width of one opaque sector, which in the case of track T1 is 1 min. 19 sec. of arc, while in the case of track T10 it is 180° of arc. The illumination of the underlying photosensor (and consequently the electrical output) is nearly linear between these two maximum and minimum points. The electrical outputs of the photosensors beneath the segments of track T1 change relatively rapidly, and each succeedingly coarser track provides an electrical output which changes with correspondingly less rapidity. The inner track, track T15, requires an angular revolution of rotary disc 22 of 5° 37 min. 30 sec. of arc in order to include both extremities of illumination and consequently both extremities of electrical output.

Photosensors A and B are connected in push-pull or back-to-back relationship with photosensor D and C respectively, the latter being located on the opposite side of cell board 24 across a diameter of the absolute encoder for the intermediate and high sensitivity tracks. As previously described the track segments of stationary disc 23 are adjusted to provide an output 180° electrically out-of-phase with the output of the hot photosensor in registration with the opposite segment. Two zero crossings are then provided for each cycle of each track; that is, a zero crossing occurs when the output goes from the maximum positive value to the maximum negative value, and a second zero crossing occurs when the output reverses and returns to the maximum positive value.

Furthermore, the photosensor D1 associated with track T1 and located 180° electrically and physically from signal photosensor A1 serves as a correcting photosensor for radial runout or miscentering. The compensating cells AC1 and DC1 which are electrically associated with and physically closely adjacent to signal photosensor A1 and correcting photosensor D1 respectively are designed to correct for variations in transparency which may result from nonuniform emulsion density during the process of manufacturing as described in U.S. Pat. No. 3,364,359 , assigned to the assignee of the present invention. Since the compensating cells are in registration with clear areas 35, 36 of stationary disc 23, the light impinging thereon is not modulated because the fine tracks T1 through T4 on rotary disc 22 always allow approximately the same amount of light to pass through to these compensating cells. Thus, the output of these cells is modulated only by any transparency variations which may occur in the rotary disc. With the output of these cells being a function of transparency variations, and assuming that these same variations also affect the light impinging upon the adjacent signal or correcting cells, back-to-back connection of the compensating cells to the cells which each compensates, as indicated in FIG. 6A, will provide a correcting signal to smooth out and essentially nullify these variations. Due to the fact that the tracks become progressively coarser and their outputs less significant, small variations which may be introduced by transparency variations are inconsequential in tracks which are coarser than track T4 and therefore the compensating cells are only provided for tracks T1 through T4.

Track T1 is also provided with a second set of waveform producing photosensors which include signal cell B1, correcting cell C1, and compensating cells BC1 and CC1. These cells are electrically connected in a manner similar to the connections of the A and D cells of track T1 and serve to provide a second electrical waveform output which is phase shifted by 90° electrically from the other output of track T1. This same phase shifted arrangement is provided for each track of the absolute encoder and is not limited merely to those tracks which have segments on stationary disc 23. The physical separation of 180° is provided for track T11 through T15 as indicated by the arrangement of photosensors in FIG. 5 while the coarsest tracks, T5 through T10, do not have any specific angular relationships between the associated photosensors which register with each track. However, each track is provided with photosensors so located on cell board 24 that two electrical outputs are provided, each phase shifted by 90° electrically and each providing two zero crossings for each waveform. On track T5 the two signal cells A5 and B5 are set up closely adjacent to each other on cell board 24. These two cells are so arranged in the relatively coarse track T5 so that they provide two electrical outputs which are phase shifted by 90°. For these tracks each opaque sector is approximately the same size as each underlying photosensor so a three-fourth period displacement between these two cells provides the two phase shifted outputs. Signal cell A5 has its associated DC bias cell D5 located in registration with clear track T8 so that it provides the DC level necessary to cause the signal from A5 to provide two zero crossings in each period. Signal cell B5 is associated with DC bias cell C5 in a similar manner.

Likewise, each of tracks T5 through T7 and T9 have two signal cells located in registration with their associated tracks on rotary disc 22 and each has a DC bias cell located in registration with clear track T8. Because of the coarseness of these tracks, neither compensating nor correcting cells are necessary. Nor is it necessary to have portions of these tracks located on stationary disc 23, because the opaque sectors themselves are sufficiently wide to completely cover, and thereby modulate, the light impinging upon the associated photocells without the necessity of having opaque sectors overlying clear sectors as required in tracks T1 through T4 and T11 through T15. It may be noted that the photosensors associated with the coarsest track T10 are located on diameters along with the photocells of the intermediate tracks T11 through T15. This is a matter of convenience considering the illumination sources and the fact that a 90° physical arrangement provides the electrical 90° phase shift required.

The illumination modules 45 and 71 are arranged so that four lamps provide h the illumination for all the tracks. Not only does this minimize the probability of error due to lamp failure, but also variations in light intensity do not have an adverse effect on the most sensitive tracks since one lamp supplies all the illumination for the sensors disposed at one side of the track and another for the sensors on the opposite side. Variations between the intensity of these two lamps are compensated for by the compensating sensors in the same manner as they compensate for transparency variations.

Module 71 provides light for all of the photosensors responsive to tracks T5 through T9 and also for the A and D sensors of tracks T10 through T15. The prisms 73 of illumination modules 71 direct light onto the photosensors which are in registration with tracks T5 through T9 except for photosensor B9, and the front surface mirrors 52 of illumination modules 71 direct light onto the A and D groups of photosensors for tracks T10 through T15 plus the photosensor B9. The two lamps in illumination modules 71 provide, therefore, illumination for 28 different individual photosensors.

The front surface mirrors 52 of illumination modules 45 direct light onto the B and C photosensors of tracks T10 through T15 while the light from lamps 58 of modules 45 passing through collimating lenses 50 provides light for the compensating cells of tracks T1 through T4. Finally, strip reflectors 65 direct light onto the signal and correcting e cells of tracks T1 through T4. Thus, illumination modules 45 provide the light for 44 individual sensors.

Since tracks T1 through T4 are extremely sensitive, the electrical phase of their output signals is likewise extremely sensitive to any slight misalignment or tilt in the angle of incident light. For this reason the strip reflectors are provided to allow fine adjustments to be made when the absolute encoder is assembled. It is apparent that with the extreme sensitivity of these four tracks, it would be exceedingly difficult to provide a reflected collimated light beam which passes through these tracks precisely perpendicular to the plane of the discs. Any number of factors could cause a slight variation in the angle of incident light and consequently an error producing phase variation in the electrical output of the photosensors which which are in registration with these tracks. In order to correct for the possibility of phase shift which may occur when the absolute encoder is assembled, the semiflexible strip reflectors are provided so that during the assembly process, each strip reflector may be individually precisely aligned to provide the beam of light in the exact phase relationship required. This adjustment is accomplished by bending each strip reflector in a direction perpendicular to the plane of the strip reflector unit, either up or down as required. When this adjustment has been made for a particular track, dowel 66 of the finally adjusted strip reflector 65 is cemented in place in its associated groove 67.

From the foregoing, it is evident that an extremely accurate electro-optical encoder has been provided wherein the light source assembly requires only four lamps to suitably illuminate all photosensors of the system and wherein phase adjustment of the light source is easily and precisely accomplished.

Various modifications and alternative implementations will occur to those versed in the art without departing from the true spirit and scope of the invention. Accordingly, it is not intended to limit the invention by what has been particularly shown and described except as indicated in the appended claims.

I claim:

1. An absolute encoder comprising:

a first and a second disc mounted concentrically for relative rotation therebetween;

said first disc having a plurality of concentric reticle tracks each track having a plurality of alternately light transmissive and opaque sectors, the number of sector pairs on each such track being different than the number of sector pairs in all other of said tracks, and related one to the other in integral powers of two such that binary coded representations of relative angular positions of said discs can be derived from said tracks;

said second disc having a plurality of reticle track segments in registration with predetermined ones of said reticle tracks, each track segment having a sector pair period identical to the sector pair period of a corresponding reticle track, the track segments associated with each reticle track being angularly displaced from one another by an amount to provide a 90° phase displacement therebetween;

a plurality of photosensor groups, each of said groups being disposed on one side of said discs in alignment with a respective one of said reticle tracks, the photosensors of each group being disposed relative to each other and to said respective track to provide in response to received illumination a pair of compensated 90° out-of-phase output signals;

a plurality of light sources arranged on the side of said discs opposite said photosensor groups for illuminating said photosensors, each of said light sources including a single lamp and an optical assembly operative to provide a plurality of light beams and to direct said light beams through said discs at predetermined portions of said reticle tracks; and said light sources associated with at least said reticle tracks having the greater number of sector pairs having means for providing collimated light and means operative to adjust the relative phase displacement of said light beams with respect to each other and associated reticle tracks.

2. The encoder according to claim 1 wherein each of said light sources includes a housing having a lamp mounted in a cavity therein:

a plurality of openings extending from said cavity to the periphery of said housing for directing a plurality of light beams from said lamp to said periphery;

a lens mounted in each of said openings; and a plurality of adjustable reflecting surfaces angularly mounted with respect to selected ones of said openings and operative to reflect selected light beams onto said discs in precise phase relation to one another and to said tracks.

3. The encoder according to claim 1 wherein said first disc has a plurality of reticle tracks comprising:

a first group of high sensitivity tracks disposed concentrically on the outermost portion of said disc;

a second group of intermediate sensitivity tracks disposed concentrically on the innermost portion of said disc;

a third group of low-sensitivity tracks disposed concentrically on said disc between said first and second groups of tracks; and a clear track disposed on said disc intermediate of said third group of tracks.

4. The encoder according to claim 3 wherein said reticle tracks have the following numbers of alternate opaque and transparent pairs, when considered from the periphery of the disc inward:

8, 192
4, 096
2, 048
1, 024
16
8
4
0
2
1
512
256
128
64
32

5. The encoder according to claim 3 wherein each reticle track of said first group of tracks has eight photosensors interconnected and arranged to produce two intensity compensated 90° out-of-phase output signals; and each reticle track of said second and third group of tracks has four photosensors interconnected and arranged to produce two 90° out-of-phase signals.

6. The encoder according to claim 5 wherein two photosensors in said third group of reticle tracks are associated with said clear track.

7. An absolute encoder comprising:

a first and a second disc mounted concentrically for relative rotation therebetween;

said first disc having a plurality of concentric reticle tracks, each track having a plurality of alternately light transmissive and opaque sectors, the number of sector pairs of each track being of different binary relationship to the other reticle tracks such that binary coded representations of relative angular positions of said discs can be derived from said tracks;

said first disc having a clear track concentric with said reticle tracks;

said reticle tracks being arranged in accordance with the number of sector pairs thereon to define high sensitivity tracks, intermediate sensitivity tracks and low sensitivity tracks;

said second disc having a plurality of reticle track segments in registration with each of said high sensitivity and intermediate sensitivity tracks, each track segment having a sector pair period identical to the sector pair period of a corresponding reticle track, the track segments associated with each reticle track being radially displaced from one another by an amount to provide 90° phase displacement between adjacent track segments of each track;

said second disc having a clear area disposed between adjacent track segments;

a plurality of photosensors disposed in alignment with each of said high and intermediate sensitivity tracks and including:

first and second photosensors arranged to receive light transmitted through said reticle track and associated track segments and operative to provide a pair of 90° out-of-phase output signals, third and fourth photosensors physically disposed 180° from said respective first and second photosensors and electrically connected thereto in phase opposition to provide output signals of zero average value and to provide compensation for disc miscentering and radial runout, and each of said high sensitivity reticle tracks including four photosensors arranged to receive light transmitted through said reticle track and a clear area of said second disc between adjacent track segments and each connected in phase opposition to a respective first, second, third and fourth photosensor to provide compensation for variations in transparency around the disc;

a plurality of photosensors disposed in alignment with each of said low sensitivity tracks and including:

fifth and sixth photosensors arranged to receive light transmitted through said reticle track and operative to provide a pair of 90° out-of-phase output signals, two photosensors in alignment with said clear track and connected in phase opposition with said respective fifth and sixth photosensors to provide output signals of zero average value; and a plurality of light modules each operative to illuminate a predetermined combination of photosensors, each module including a single lamp and an optical assembly operative to provide a plurality of light beams and to direct said light beams onto a plurality of selected portions of said tracks; and the light modules arranged to illuminate said high sensitivity and intermediate sensitivity tracks including means for collimating the light beams incident thereon and means operative to adjust the relative phase displacement of said light beams with respect to each other and with respect to the associated tracks.

8. The encoder according to claim 7 wherein said light modules arranged to illuminate said high sensitivity and intermediate sensitivity tracks includes a plurality of reflective surfaces each disposed in alignment with a respective reticle track and each being adjustable to vary the angle of reflection of light impinging upon it from said lamp.

UNITED STATES PATENT OFFICE

CERTIFICATE OF CORRECTION

Patent No. 3,549,897 Dated December 22, 1970

Inventor(s) Lawrence S. Blake

It is certified that error appears in the above-identified patent and that said Letters Patent are hereby corrected as shown below:

Column 6, lines 35 and 36, "contract" should read --contrast--.

Column 8, lines 29 and 30, after "flange" delete --84, cell board bracket 85, cell board clamp 86, and top mounting flange--.

Column 8, line 45, after "openings" delete --97 in the housing--.

Column 9, line 25, delete --hot--.

Column 9, line 73, "track" should read --tracks--.

Column 10, line 37, after "provide" delete --h

Column 10, line 61, after "correcting" delete --ê-

Column 11, line 2, delete --which--.

Column 11, line 3, "shift" should read --shifts--.

Column 11, line 53, after ";" insert --and--.

Column 11, line 60, after ";" delete --and--.

Signed and sealed this 27th day of June 1972.

(SEAL)
Attest:

EDWARD M.FLETCHER,JR.
Attesting Officer

ROBERT GOTTSCHALK
Commissioner of Patents